US012761947B2

(12) United States Patent
Igelka et al.

(10) Patent No.: US 12,761,947 B2
(45) Date of Patent: Oct. 13, 2026

(54) SCHEDULING AND LOAD-BALANCING REPLICATION-BASED MIGRATIONS OF VIRTUAL MACHINES

(71) Applicant: Google LLC, Mountain View, CA (US)

(72) Inventors: Or Igelka, Tel Mond (IL); Shahar Glixman, Kiryat Tivon (IL)

(73) Assignee: Google LLC, Mountain View, CA (US)

( * ) Notice: Subject to any disclaimer, the term of this patent is extended or adjusted under 35 U.S.C. 154(b) by 712 days.

(21) Appl. No.: 17/707,483

(22) Filed: Mar. 29, 2022

(65) Prior Publication Data

US 2023/0315515 A1 Oct. 5, 2023

(51) Int. Cl.
*G06F 9/48* (2006.01)
*G06F 9/50* (2006.01)

(52) U.S. Cl.
CPC .......... *G06F 9/4856* (2013.01); *G06F 9/4881* (2013.01); *G06F 9/5077* (2013.01); *G06F 2209/485* (2013.01)

(58) Field of Classification Search
CPC .... G06F 9/4856; G06F 9/4881; G06F 9/5077; G06F 2209/485; G06F 9/5088
See application file for complete search history.

(56) References Cited

U.S. PATENT DOCUMENTS 11,256,541 B2 * 2/2022 Okuno .................. G06F 9/4856
11,720,455 B2 * 8/2023 Chu ...................... G06F 9/4856 714/4.11
2011/0265164 A1 * 10/2011 Lucovsky ........... G06F 9/45533 718/1
2012/0096460 A1 * 4/2012 Sekiguchi ............ G06F 9/4856 718/1
2012/0192182 A1 * 7/2012 Hayward ............ G06F 9/45558 718/1
2013/0339956 A1 * 12/2013 Murase ............... G06F 9/45558 718/1
2018/0329737 A1 * 11/2018 Dong .................. G06F 9/45558
2020/0042340 A1 * 2/2020 Wiggers ................ G06F 9/5077
2020/0133706 A1 * 4/2020 Koehler .............. G06F 9/45558

(Continued)

OTHER PUBLICATIONS

When to Choose AWS Application Migration Service, [online] [retrieved Mar. 25, 2022]. Retrieved from the Internet: <https://aws.amazon.com/application-migration-service/when-to-choose-aws-mgn/>, 9 pages.

(Continued)

*Primary Examiner* — Pierre Vital
*Assistant Examiner* — Tuan M Nguyen
(74) *Attorney, Agent, or Firm* — Lerner David LLP

(57) ABSTRACT

Aspects of the disclosure provide for ordering and scheduling operations for migrating virtual machines in parallel. A migration system can provide for ordering and scheduling operations to be performed when only a subset of virtual machines slated for migration can be migrated at a time. Aspects of the disclosure provide for migrating interdependent virtual machines. Interdependent virtual machines may at least partially rely on data generated by applications or services of other virtual machines in the group. A migration system schedules and orders migration cycles to reduce the down time of services implemented by the virtual machines during cut-over operations in the migrations of the virtual machines.

14 Claims, 6 Drawing Sheets

(56) References Cited

U.S. PATENT DOCUMENTS

| | | | | |
|---|---|---|---|---|
| 2020/0133718 | A1* | 4/2020 | Koehler | G06F 9/5077 |
| 2020/0142732 | A1* | 5/2020 | Okuno | G06F 9/5044 |
| 2020/0257554 | A1* | 8/2020 | Okuno | G06F 9/5077 |
| 2022/0027182 | A1 | 1/2022 | Igelka et al. | |

OTHER PUBLICATIONS

About Azure Migrate, Feb. 17, 2022, <https://docs.microsoft.com/en-us/azure/migrate/migrate-services-overview>, 7 pages.
What is Movere?, Oct. 27, 2021, <https://docs.microsoft.com/en-us/movere/overview>, 6 pages.
Acharya et al. A Taxonomy of Live Virtual Machine (VM) Migration Mechanisms in Cloud Computing Environment. 2013 International Conference on Green Computing, Communication and Conservation of Energy (ICGCE), IEEE, Dec. 12, 2013 (Dec. 12, 2013), pp. 809-815.
International Search Report and Written Opinion for International Application No. PCT/US2023/016538 dated Jun. 6, 2023. 15 pages.

* cited by examiner

SCHEDULING AND LOAD-BALANCING REPLICATION-BASED MIGRATIONS OF VIRTUAL MACHINES

BACKGROUND

Virtual machine migration is the process by which a computing system or platform moves, copies, or clones a virtual machine from a source computing environment to a target computing environment. The computing resources can include processors, memory, and other components for hosting a virtual machine. The source and target computing environments can be on the same physical computing device, or in different physical devices at the same or different physical locations.

Replication-based migration refers to a process in which a virtual machine is moved or copied by continuously taking snapshots of the virtual machine while operating in a source computing environment and replicating the snapshots or differences between snapshots to a target computing environment. Migration ends when a cut-over operation is performed, in which the virtual machine at the source computing environment is shut down, the last snapshot is replicated onto the target computing environment, and a virtual machine at the target computing environment is started.

A virtual machine is usually associated with at least one disk, and migration involves copying the contents of at least one disk associated with the virtual machine to at least one disk of a target computing environment. A device performing migration can read the contents of a disk as a disk snapshot, and during replication-based migration multiple disk snapshots or differences between disk snapshots may be identified for moving or copying to disks of the target computing environment. A virtual machine snapshot represents the complete state of a virtual machine at a given time, including one or more disk snapshots taken of the virtual machine during the given time. Virtual machine snapshots and disk snapshots are accessible for reading at any time, even if the state of the corresponding virtual machines and disks has changed.

BRIEF SUMMARY

Aspects of the disclosure provide for ordering and scheduling operations for migrating virtual machines in parallel. A migration system can order and schedule operations to be performed when only a subset of virtual machines slated for migration can be migrated at a time. Aspects of the disclosure provide for migrating interdependent virtual machines. Inter-dependent virtual machines are virtual machines that may at least partially rely on data generated by applications or services of other virtual machines in the group. A migration system schedules and orders migration cycles such that cut-over down-time for services implemented by the migrating virtual machines are reduced. In examples in which the interdependent virtual machines collectively execute a service, the migration system reduces the downtime of the service incurred by performing cut-over operations for the virtual machines as the virtual machines are transitioned from a source computing environment to a target computing environment.

Ordering and scheduling as described herein can additionally be based on constraints, weights, and limited computing resources allocated to a system performing migration of virtual machines according to aspects of the disclosure. Aspects of the disclosure also provide for load-balancing the migration system according to various work distribution mechanisms, in addition to the scheduling.

Aspects of the disclosure provide for a system including: one or more processors configured to, during one or more migration cycles of a migration of multiple virtual machines from one or more source computing environments to one or more target computing environments: identify, from the multiple virtual machines, a plurality of virtual machines from a source computing environment of the one or more source computing environments; generate a schedule for performing the migration of the multiple virtual machines, the schedule including cut-over operations for completing the migration of each of the plurality of virtual machines; and perform the migration in accordance with the generated schedule.

Aspects of the disclosure provide for a method including: during one or more migration cycles of a migration of multiple virtual machines from one or more source computing environments to one or more target computing environments: identifying, by one or more processors and from the multiple virtual machines, a plurality of virtual machines from a source computing environment of the one or more source computing environments; generating, by the one or more processors, a schedule for performing the migration of the multiple virtual machines, the schedule including cut-over operations for completing the migration of each of the plurality of virtual machines; and performing, by the one or more processors, the migration in accordance with the generated schedule.

Aspects of the disclosure provide for one or more non-transitory computer-readable storage media encoding instructions that are operable, when executed by one or more processors, causes the one or more processors to perform operations including: during one or more migration cycles of a migration of multiple virtual machines from one or more source computing environments to one or more target computing environments: identifying, from the multiple virtual machines, a plurality of virtual machines from a source computing environment of the one or more source computing environments; generating a schedule for performing the migration of the multiple virtual machines, the schedule including cut-over operations for completing the migration of each of the plurality of virtual machines; and performing the migration in accordance with the generated schedule.

Aspects of the disclosure provide for one or more of the following features. In some examples, aspects of the disclosure provide for all of the features, together in combination.

The plurality of virtual machines at least partially implements a service, wherein at least one virtual machine of the plurality of virtual machines is configured to execute operations that receives, as input, data generated by another virtual machine of the plurality of virtual machines.

The plurality of virtual machines is a first plurality of virtual machines, and the one or more processors are further configured to: identify a second plurality of virtual machines of the one or more source computing environments; and update the generated schedule, the updated schedule including operations for suspending migration of the first plurality of virtual machines and performing migration of the second plurality of virtual machines.

The one or more processors are further configured to: determine whether to suspend migration of the first plurality of virtual machines and execute operations for performing migration of the second plurality of virtual machines, at least partially based on received constraint data specifying one or more constraints for migrating the multiple virtual machines.

The one or more processors are further configured to receive weights indicating priorities for one or more of the one or more virtual machines in a migration, the one or more source computing environments, or the one or more target computing environments; and wherein the determination is at least partially based on the weights.

The one or more processors are further configured to receive hardware utilization data characterizing the hardware utilization of one or more of the multiple virtual machines; and wherein the determination is at least partially based on the hardware utilization data.

The generated schedule specifies when to initiate a respective migration cycle for at least a portion of the multiple virtual machines.

The generated schedule specifies performing operations related to migration for each of the plurality of virtual machines, in parallel.

DETAILED DESCRIPTION

Overview

Figure 1:
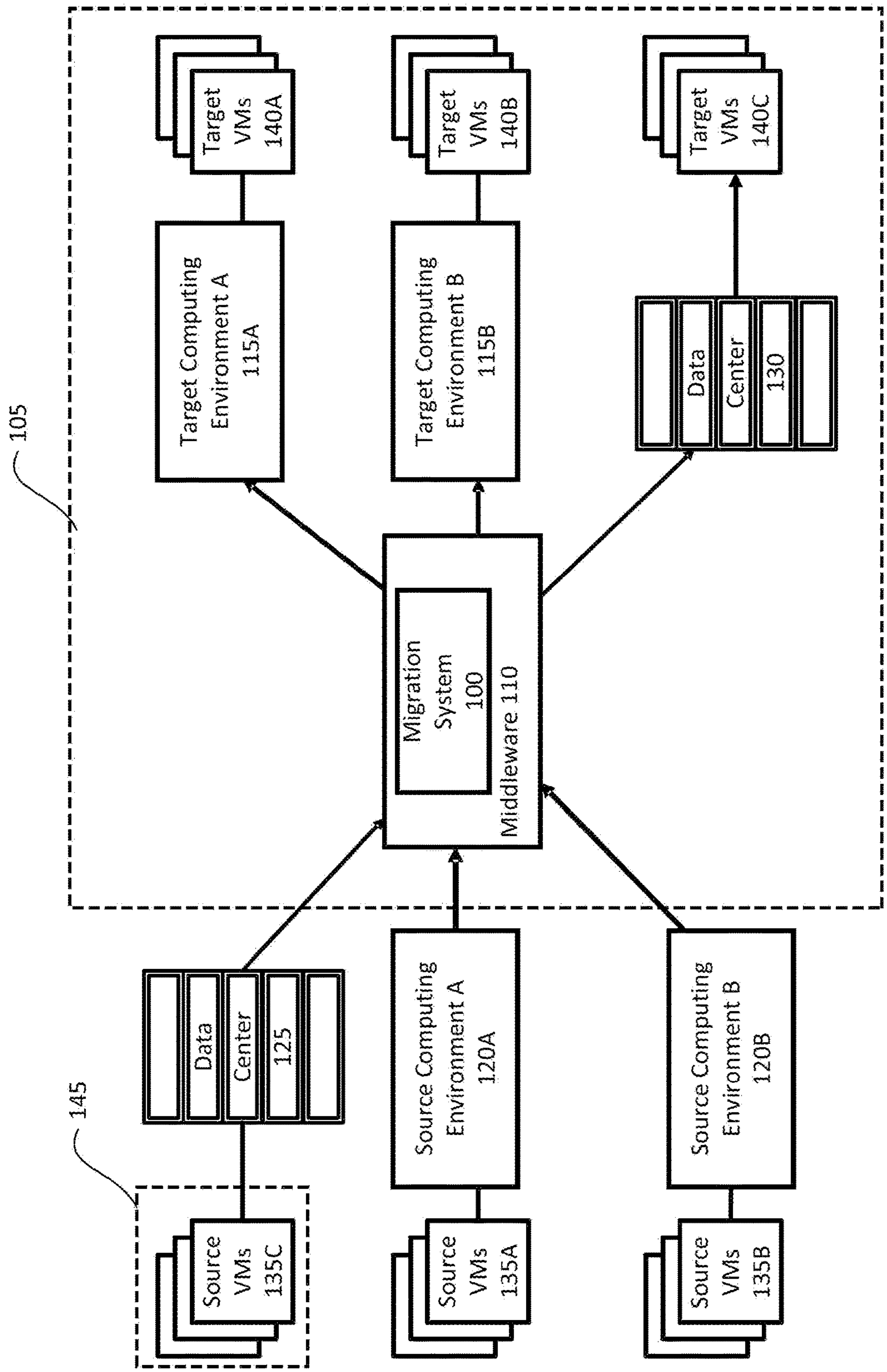
FIG. 1 is a block diagram of a migration system of a computing platform implementing migration of multiple virtual machines, according to aspects of the disclosure.

Aspects of the disclosure provide for scheduling and load-balancing replication-based migration for multiple virtual machines. A replication-based virtual machine migration system ("migration system") can prioritize, schedule, and load-balance migration of multiple virtual machines.

Multiple virtual machines may be scheduled for migration. A migrating virtual machine may at least partially execute a service or application that is dependent on output from a service executed by another virtual machine also being migrated. In examples in which multiple migrating virtual machines may implement a service, a migration system as described herein can provide for scheduling the migration of these interdependent virtual machines to reduce cut-over downtime of a service implemented by the interdependent virtual machines. Multiple virtual machines can implement various services which may be migrated in parallel. the time between cut-over operations for the interdependent virtual machines. The migration system can reduce downtime of a collective service provided by a platform implementing the service through multiple virtual machines.

The migration system can also load-balance computing resources dedicated to migrating various interdependent virtual machines, to reduce the chance of migration failing for some virtual machines. Migration failure can result in downtime of a service that is being implemented by the migrating virtual machines.

In addition to scheduling and load-balancing interdependent migrating virtual machines, aspects of the disclosure provide for automatic prioritization of cut-over operations for migrating virtual machines, in accordance with automatic or user-defined constraints, weights, limits, or priorities, described in more detail herein.

The migration system as described herein can receive information about the hardware utilization of a migrating virtual machine and/or software running on the source computing environment. In addition, the migration system can receive additional metadata about the source computing environment, such as constraints, limitations, and capacities, e.g., measured in terms of maximum allocated memory or network bandwidth for a virtual machine in the source computing environment, as examples. The system can use data characterizing the hardware utilization of the various migrating virtual machines to determine how many virtual machines may be migrated in parallel. This prioritization can be done in conjunction with prioritizing migration of different virtual machines based on their inter-dependence, in some examples.

The migration system as described herein can schedule migration cycles for migrating virtual machines, based on, for example, characteristics of virtual machines in migration, as well as computing resources, e.g., network bandwidth, number of processing cycles, required for performing a migration cycle at a given point in time. In some examples, this scheduling can be performed to prioritize migration cycles for virtual machines migrating in parallel, including interdependent virtual machines. Scheduling can be based on user-defined or automatically applied conditions. Example conditions for scheduling can include maximizing a number of virtual machines migrating in parallel, ensuring that prioritized virtual machines are migrated before non-prioritized virtual machines, maintaining a minimum or maximum level of utilization of computing resources dedicated, etc.

Aspects of the disclosure can provide for at least the following technical advantages. By scheduling and load-balancing the migration of virtual machines as described herein, a migration system can reduce the downtime of services implemented across multiple interdependent virtual machines. Available computing resources can be used more efficiently, at least through load-balancing the ordered and scheduled migration cycles. Migration can be performed with minimal user input, for example by receiving user-provided constraints or weights, and automatically ordering and scheduling operations of migration for selected virtual machines in accordance with the constraints and weights. Migration of virtual machines can be performed on limited computing resources available to a migration system in accordance with aspects of the disclosure. Further, rather than blindly allowing migration cycles of all types to be performed in parallel, e.g., on a first-come, first-served, manner, aspects of the disclosure provide for reducing the failure of migration cycles due to a lack of available computing resources.

Example Systems

FIG. 1 is a block diagram of a migration system 100 of a computing platform 105 implementing migration of multiple virtual machines, according to aspects of the disclosure.

The computing platform 105 can be a collection of computing devices, such as servers, in one or more physical locations and connected over a network to one or more other computing devices. Middleware 110 can include, for example one or more physical computing devices and/or one or more virtual machines configured to perform migration cycles. For example, the computing platform 105 can be a cloud computing platform accessible by different computing devices over the internet. A computing platform can refer to a central physical or virtual environment of devices running software accessible to other devices over a network. The computing platform 105 can implement a number of target computing environments, e.g., target computing environments 115A-115B. The devices can include servers but may vary from example-to-example. The software running on the computing platform 105 can include applications or services running in virtual machines. In some examples, the computing platform is a containerized environment running containers on bare metal architecture or in virtual machines. Middleware 110 can be implemented as part of the computing platform 105, the source computing environments 120A-120B, and/or as one or more devices on a system separate from, but in communication with, the computing platform 105.

As shown in FIG. 1, the computing platform 105 can be in communication with source computing environments 120A-B ("source environment") and implement target computing environments 115A-B ("target environment"). It is understood that in various examples, one or more of the source computing environments or the target computing environments may be implemented in one or more different physical locations, for example across different platforms or datacenters. For example, datacenter 125 may be implemented as an on-premises source environment, relative to an entity, such as an individual or organization like a company or enterprise, maintaining the datacenter 125. Target environments 115A-B may be implemented on the computing platform 105 accessible over the internet. The computing platform 105 may be maintained by a cloud provider. Datacenter 130 may also be a target environment, implemented as part of the platform 105 or implemented as one or more devices in a system separate from the platform 105.

Middleware 110 can implement migration system 100. The migration system 100 is configured to perform a migration of a virtual machine from a source environment to a target environment. In FIG. 1, the source computing environments 120A-B and 125 include source virtual machines 135A-135C, respectively. The migration system 100 is configured to perform a migration of the source virtual machines over one or more migration cycles, until a cut-over operation is performed, and corresponding target virtual machines 140A-C are deployed in the target environments 115A-B and 130. One or more of the migration system 100, source virtual machines 135A-C, and target virtual machines 140A-C can be deployed with computing resources including a processor, memory, and storage device, as described herein with reference to FIG. 6.

During replication-based migration, the migration system 100 migrates a source virtual machine by taking snapshots of the source virtual machine, potentially while the source virtual machine is still running in the source environment. migration occurs over one or more migration cycles. The number and occurrence of migration cycles can depend on how the migration service is configured, for example in accordance with a process for scheduling migration cycles and/or a process for deciding when to perform a migration cycle, as described herein.

A migration cycle can refer to the completion of a transfer of a virtual machine snapshot, or data characterizing changes between a current and a previous snapshot, to the target environment. The migration cycles of a replication-based migration can be any of a variety of types, including: first sync, in which the entire state of the source virtual machine is captured as a virtual machine snapshot; periodical, in which data characterizing a difference between a current and a previous state of the source virtual machine is captured in accordance with a schedule generated by the migration system 100; a user-triggered migration cycle, in which a migration cycle occurs in response to user input; and a cut-over operation, in which the source virtual machine is shut down and the last snapshot of the source virtual machine is copied and sent to the target environment.

During the migration but before the cut-over operation, the migration system 100 can maintain a test clone of a target virtual machine, matching the state and settings of the source virtual machine at a corresponding migration cycle. The migration service may maintain multiple test clones for a virtual machine, each corresponding to a respective migration cycle. The multiple test clones can correspond to the same migration cycle, in some examples. Each test clone has a respective set of target virtual machine settings for use while deployed in the test environment.

Although described herein in some examples with reference to a single virtual machine, it is understood that the migration service is configured to perform mass migration, in which multiple virtual machines are migrated to one or more target environments. Different virtual machines may be targeted for migration at different times, and collectively are referred to as migration waves.

In some examples, the migration system 100 as described herein can implement live migration of virtual machines 135A-C. In a live migration, the memory state, e.g., RAM state of each migrating virtual machine is copied, and the network connectivity of each migrating virtual machine is retained, such that the virtual machine is migrated without disconnecting the service running on the virtual machine. As part of performing a live migration, the migration system 100 can maintain and generate test clones for migrating virtual machines, up until a cut-over operation is performed. It is understood that references to migration may be substituted with live migration, without loss of generality.

As described herein, the migration system 100 can receive information relating to one or more of constraints, priorities, weights, or hardware utilization for migrating virtual machines. The migration system 100 can identify groups of interdependent virtual machines, for example virtual machines 135C of data center 125 implementing a service 145. The migration system 100 can generate a schedule for performing migration cycles for a subset of selected virtual machines, in parallel, and including a group of interdependent virtual machines. The schedule can include an order, which executed by the migration system 100, causes the migration system 100 to perform certain migration cycles or operations within a migration cycle and according to a particular order. The order specified can be based at least partially on ensuring that cut-over operations for the interdependent virtual machines are performed at or within a predetermined amount of time. The specified order can also be at least partially based on the received information. In addition to the scheduling and ordering, the migration system 100 can perform load-balancing for performing operations in accordance with a generated schedule.

Figure 2:
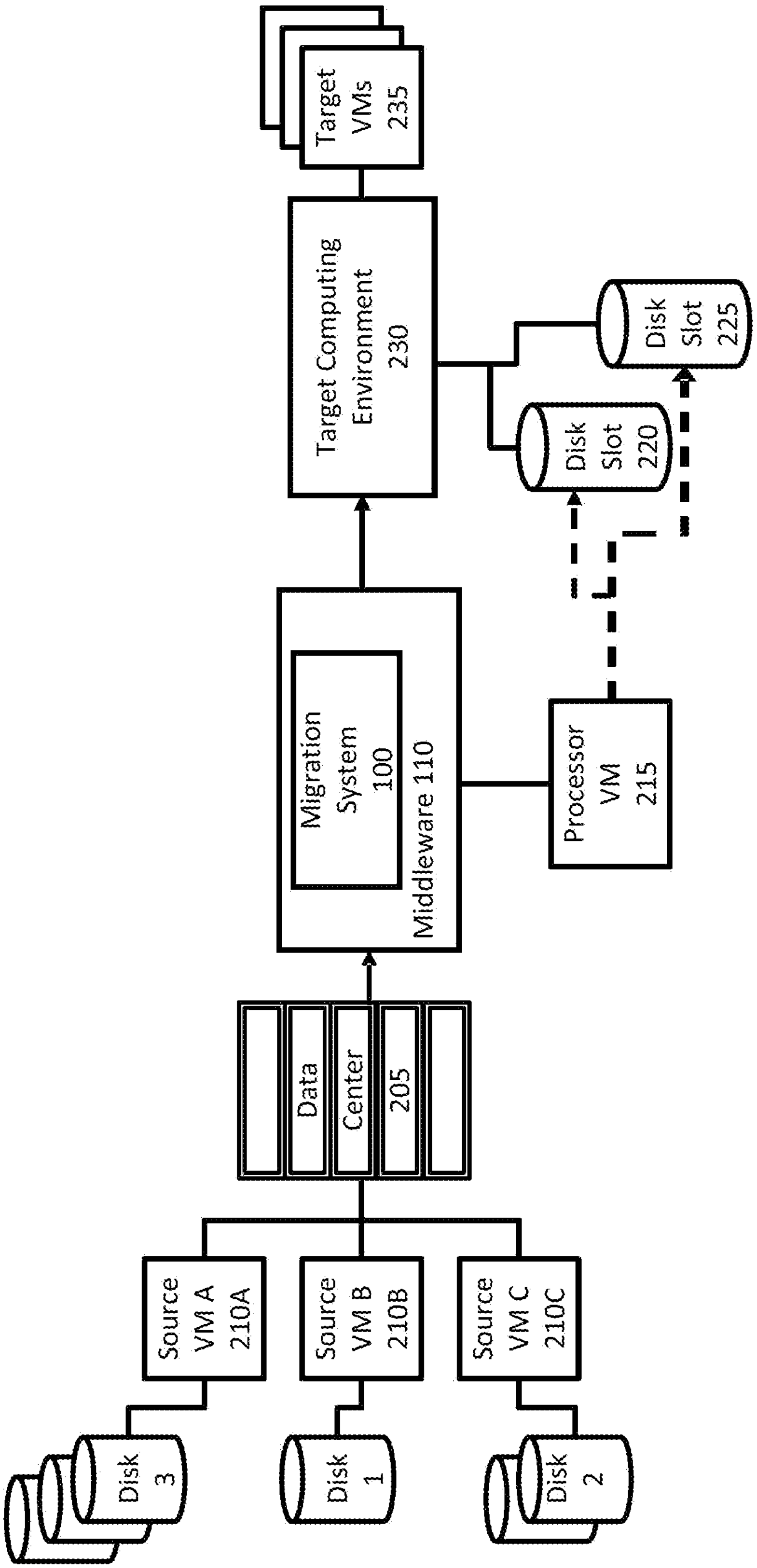
FIG. 2 is a block diagram of a source datacenter with multiple virtual machines migrated by the migration system, according to aspects of the disclosure.

FIG. 2 is a block diagram of a source datacenter 205 with multiple source virtual machines 210A-210C migrated by the migration system 100, according to aspects of the disclosure. Datacenter 205 can host source virtual machines 210A-210C, having disk 3, disk 1, and disk 2, representing three, one, and two disks, respectively. The migration system 100 can implement a processor virtual machine 215 with attached disks 220, 225. The processor virtual machine 215 can be one of any number of virtual machines allocated to the migration system 100 for performing migration cycles for the source virtual machines 210A-210C. As described herein, the migration system 100 can scale computing resources allocated to it, e.g., by adding more or removing processor virtual machines. In the example shown in FIG. 2, source virtual machines 210A-210C are being migrated to target virtual machines 235 of target computing environment 230.

Constraints may refer to bottlenecks, capacities, or limitations of migrating certain virtual machines by the migration system 100. The migration system 100 may be allocated a fixed amount of computing resources, e.g., processor cycles, network bandwidth, or memory capacity, etc., for performing the operations involved with migrating different virtual machines. These operations may include, for example, executing a migration cycle, performing cut-over operations, and so on. Constraints on the migration system can vary, for example as the migration system 100 is prioritized or deprioritized relative to other systems competing for resources on the computing platform 105, or as a result of manual or automatic reallocation of resources to the system 100.

The migration system 100 is configured to query one or more of the source computing environments, e.g., source computing environments 120A-B, datacenter 125, datacenter 205, the target computing environments, e.g., target computing environments 115A-B, datacenter 130, target computing environment 230, and devices or components of the migration system 100 itself. For example, the migration system 100 can query a source computing environment to determine whether there is a maximum network bandwidth imposed on communicating data as part of performing a migration. In some examples, the migration system 100 can measure characteristics of components of the system 100, such as a network connection between the system 100 and the source or target computing environment. In the example of a network connection, the migration system 100 can determine a maximum throughput for the connection.

The migration system 100 processes the queried constraint data to determine what resources are available for migrating the virtual machines. For example, the migration system 100 can determine, from the queried constraints, a maximum number of virtual machines that can be migrated by the system 100 in parallel.

The system 100 can use the determined maximum limit as part of scheduling and load-balancing migrations, for example by using the limit to determine whether additional virtual machines should be added or removed for parallel migration. In one example, virtual machine A and virtual machine B are scheduled for migration, and virtual machine A requires quantity x of computing resources, while virtual machine B requires quantity y of computing resources. In this example, assume that, based on the maximum limit determined by the migration system 100, the migration system 100 can support up to a quantity x of resources, but not a quantity y. All other things between virtual machines A and B being equal, e.g., same priority or weights associated among the virtual machines, the migration system 100 can also begin migrating virtual machine A in parallel with other virtual machines.

In addition, or alternatively, the migration system 100 can process the queried constraint data to determine which virtual machines should be migrated in parallel at a given point in time. For example, because the migration system 100 may be more or less constrained at different points in time, and because some virtual machines or groups of virtual machines may require varying levels of computing resources to migrate, the system 100 can use the queried constraint data to determine whether the migration system 100 is available for migrating certain, more computationally demanding, groups of virtual machines.

In one example, a virtual machine group A requires a quantity x of computing resource to migrate, and virtual machine group B requires a quantity y of computing resources, x less than y. In this example, the system 100 receives constraint data and determines that a quantity y amount of resources are currently available. Assuming all other things between group A and group B being equal, e.g., same priority or weights associated with the virtual machine groups, the system 100 can cause group B to migrate over group A, to take advantage of existing conditions of the system 100 allowing the migration of group B to proceed. Later, if the migration system 100 determines from queried constraint data that only up to a quantity x of computing resources is available, the migration system 100 can switch back to operations for migrating group A. In other words, the migration system 100 can pause or temporarily suspend migration of certain virtual machines or groups of virtual machines to take advantage of current conditions allowing more computationally demanding virtual machine migrations to proceed.

The querying and processing of the constraint data as described herein can be periodic, e.g., according to a predetermined schedule, or user-triggered, e.g., in response to user input. In some examples, the querying and processing of the constraint data is continuous. For example, the migration system 100 may continuously sniff a network channel to identify changes in network activity.

In some examples, constraints can be artificially applied, meaning that the migration system 100 is limited by certain defined constraints, e.g., a maximum network bandwidth, even if the computing resources allocated to the migration system 100 can operate in excess of the artificial constraints. Artificial constraints can also include a minimum or maximum utilization of computing resources allocated to the migration system 100, for example to ensure that allocated resources are not idle. The artificial constraints may also be based on the cost to run the migration system 100, either in general or during certain points in the day when demand may be higher or lower for computing resources across the computing platform 105.

Artificial constraints may also include constraints imposed on the migration system 100 for ensuring a minimum quality of service (QoS). QoS can refer to a minimum standard, e.g., measured by time required for performing migration of a virtual machine, time required to respond to a user request to initiate or adjust migration of a group of virtual machines, etc. To meet a QoS, additional constraints can be imposed on the migration system 100. These constraints can include, for example, reserving a minimum amount of computing resources, e.g., half of the resources available to the migration system 100, for performing cut-over operations.

As another example, artificial constraints can be imposed to reserve a certain percentage of migration cycle slots for virtual machines migrating from or to a particular source or target computing environment, respectively. As another example, a portion of computing resources for disk writing and/or disk reading can be reserved for migration cycles for designated virtual machines. As another example, the migration system 100 can reserve a portion of the available network upload and download rates between a source and a target computing environment for use by the migration system 100 when implementing migration operations.

As another example, the migration system 100 can reserve a portion of available disk slots, for the processing of migrating disks below a predetermined size, e.g., 100 GB. In this example, computing resources are reserved to act as an express lane for smaller disks, as compared with disks larger than 100 GB. In one example use case, a target virtual machine can be set up after only its boot disk is migrated, before its additional data disks have completed their migration.

Referring to FIG. 2, multiple parallel network channels may be available from datacenter 205 to target computing environment 230, which also may be equal in capacity or bandwidth. In some instances, one channel may be reserved for handling change sets, e.g., differences in data between virtual machine snapshots, that are up to 10 gigabytes in size. In some examples, one of disk slots 220, 225 can also be reserved only for cut-over migration cycles. In other words, if disk slot 220 is reserved for cut-over migration cycles, then that means only cut-over migration cycles may have their associated disks processed at disk slot 220.

In addition, or as an alternative to scheduling and load-balancing virtual machine migrations based on constraint data, the migration system 100 can schedule and load-balance virtual machine migrations based on weights assigned to various virtual machines, components of the migration system 100, and/or operations performed by the migration system 100 for replication-based migration. A weight refers to a value, e.g., numerical, or categorical, representing a quantitative measure for comparing different weighted virtual machines, components, or operations, such as migration cycles.

Generally, if a first virtual machine is more heavily weighted than a second virtual machine, then all other things being equal, e.g., same computational requirement to migrate, etc., the migration system 100 will select the more heavily weighted virtual machine for migration over the less heavily weighted virtual machine. For example, a first virtual machine may be marked as three times more important for migration relative to a second virtual machine, by assigning the first virtual machine a weight that is three times larger than the weight of the second virtual machine.

Components of the migration system 100 may also be weighted. For example, the migration system may communicate with various different source computing environments through respective network channels. Each network channel can be weighted to prioritize migration performed through some channels over migration performed through other channels.

Certain operations performed by the migration system 100 for migrating different virtual machines may also be weighted. For example, the migration system 100 can weight cut-over cycles, e.g., cycles in which cut-over operations are performed, more heavily than sync-now cycles, e.g., migration cycles triggered by user input, or periodical cycles, e.g., automatically scheduled migration cycles. Weighting different types of operations in effect weights virtual machines that are subject to the weighted operations. For example, in the example in which cut-over operations are weighted more heavily over other types of operations, virtual machines in which a cut-over operation is due to be performed will be implicitly weighted more heavily than virtual machines in other stages of migration.

In some examples, entire migration sources, e.g., an entire source computing environment, can be weighted. By weighting source computing environments higher or lower relative to one another, the migration system 100 can be configured to allocate more or less computing resources to the migration system itself, e.g., middleware components implementing the system 100, and/or to target computing environments. As described herein, the migration system 100 can receive constraint data to determine a maximum number of virtual machines that can be migrated by the system 100 in parallel. The migration system 100 can further use assigned weights to determine whether or not to add or remove virtual machines from migration.

Weights can be user-provided or automatically derived by the migration system 100. For example, the migration system 100 can identify the size of each virtual machine, e.g., by summing the size of each disk of the virtual machine. The migration system 100 can set the weight of the virtual machine as 1 over its disk size, so virtual machines with larger disks are weighted less than virtual machines with smaller disks. As another example, the migration system 100 can determine the size of a delta of data for each migration cycle, and set the weight of the migration cycle as a function of the delta, so a bigger delta results in a larger weight. As another example, the migration system 100 can continuously set or update the weight of a network channel based on setting its weight as its unutilized throughput. For instance, the network channel can be weighted more heavily when the unutilized throughput is large. In some examples, the migration system 100 can by default assign each virtual machine a default, identical weight, and throughout migration adjust weights for some virtual machines.

As part of scheduling and prioritizing virtual machine migrations, in some examples the migration system 100 can apply additional constraints or requirements for introducing uniformity in the treatment of virtual machines during migration. These additional constraints or requirements may or may not be strictly adhered to. In some examples, these additional constraints or requirements are applied only after satisfaction of any other constraints, and their application may not be considered a requirement, unlike other types of constraints. Constraints of this type are referred to as constraints for fairness.

In examples in which constraints for fairness are applied by the migration system 100, constraints for fairness can be applied relative to a group of interdependent virtual machines. For example, the migration system 100 may apply these constraints for fairness to ensure that each virtual machine is migrated so as to reduce the down time of services implemented by the virtual machines. As described herein, reducing the time between cut-over operations for interdependent virtual machines can reduce the downtime of the service implemented by the group of interdependent virtual machines.

Example constraints for fairness can include requiring the equal division of network upload bandwidth between all migrating virtual machines, so that migration cycles progress at the same rate. Another example constraint can include requiring the equal division of network upload bandwidth between migrating virtual machines running in parallel. Another example constraint for fairness can be requiring migration cycles for all virtual machines or migration cycles for all virtual machines in parallel to end at about the same time. Similar constraints can also be applied at a disk migration level—between all virtual machines or all virtual machines running in parallel at a given point in time.

Additional constraints for fairness can include requiring that each migrating virtual machine has completed the same number of migration cycles before moving on to a subsequent migration cycle. Another constraint for fairness can include allocating the same amount of computing resources, e.g., the middleware 110, for all source computing environments, regardless of how many virtual machines are migrating from each source computing environment. In another example, each target computing environment can also be assigned the same amount of computing resources available to the migration system 100.

The migration system 100 can prioritize different virtual machines over others during a migration, acting as an arbiter of which virtual machines to perform migration operations for in parallel, especially when there are more virtual machines slated for migration than those that can be performed in parallel. Given the option of performing migration operations for one of two virtual machines, the migration system 100 can select the virtual machine with the higher priority level for migrating. Priority can be quantified, e.g., as a weight, or indicated categorically, e.g., "high priority," "medium priority," or "low priority."

As described herein, both virtual machines and types of migration cycles performed for the virtual machines can be prioritized according to different priority levels. The priority levels themselves may be determined by the migration system 100 itself, for example based on constraints, hardware utilization, weights, etc., described herein.

As described herein, both virtual machines and types of migration cycles performed for the virtual machines can be prioritized according to different priority levels. The priority levels themselves may be determined by the migration system 100 itself, for example based on constraints, hardware utilization, weights, etc., described herein.

In some examples, groups of interdependent virtual machines implementing a service are assigned the same priority level, for example automatically by the migration system, and/or according to user input. By assigning the same priority level to interdependent virtual machines, the migration system 100 facilitates performing the migration of each virtual machine in parallel, so that the down time of services implemented by the migrating virtual machines is minimized or reduced.

Example prioritization schemes can include, prioritizing the migration of some virtual machines over others, prioritizing the migration of virtual machines from some source computing environments over others, and/or prioritizing the migration of virtual machines to some target computing environment over others. Virtual machines may also be prioritized at different levels based on the type of migration cycle performed for migrating each virtual machine, as well as which parts of the computing resources, e.g., the middleware 110 of the migration system 100 are assigned to execute operations relating to the migration of the virtual machines.

For example, the migration system 100 can generate a composite priority score for each migrating virtual machine, migration cycle, computing resource, or network channel, etc. The composite priority score can be based on, for example, the ordering mechanism implemented by the system 100 and described herein, constraints—including fairness—and weights applied, either automatically or user-generated.

The migration system 100 can implement a respective priority queue for each migrating virtual machine, migration cycle, computing resource, network channel etc. The migration system 100 can dequeue from the priority queues based on the respective priority score for each element in the queues.

The migration system 100 can implement one or more agents within a source computing environment, middleware, or target computing environment for dequeuing the next element "in line" from the priority queues. The enforcement of the prioritization mechanism and any matching resource utilization limitations may be done by one or more of the agents.

For example, an agent of the migration system 100 may be installed in a source environment and may make the determination to decide which migrating virtual machine from the source environment should be prioritized for uploading at least part of the delta of its current migration cycle over a single network upload channel. For example, the agent may prioritize migrating virtual machines because only a single or limited number of network upload channels are available for communicating between the source and the target environment. As another example, the migration system 100 installed in the middleware may choose to preempt the current processing of a migration cycle and put it back into the priority queue. The migration system 100 may do so in favor of processing a different migration cycle whose priority has been bumped. The migration system 100 can continuously monitor for changes in priority score. The migration system 100 may also peek at the priority queues to determine whether what is currently being processed is still higher than everything else in the priority queues currently.

Another example prioritization scheme can include execution of a migration cycle for a virtual machine marked as having higher priority than the migration cycle for another virtual machine.

The migration system 100 is configured to generate a schedule indicating when operations related to migration are to be performed for certain migrating virtual machines, and when. According to aspects of the disclosure, in generating the schedule, the migration system 100 may be configured to generate a schedule that causes virtual machines to be migrated so as to reduce down time of the services implemented by the virtual machines.

In some examples, the migration system 100 is configured to receive and apply an order of precedence for the migration of virtual machines associated with different users of the computing platform 105. The order can be represented as data and form at least part of the generated schedule. In yet other examples, the migration system 100 is configured to receive and apply any order of precedence for performing certain migration operations. Through orders, the migration system 100 can be used to support priorities among virtual machines, components of the migration system 100, and/or migration operations.

Orders received by the migration system 100 can be predetermined, received by user input, and/or determined by the migration system 100 itself. An order can be received as metadata that the migration system 100 can use to configure itself according to the order specified in the metadata. After configuration, the migration system 100 may enforce these configurations, identify conflicting configurations, prevent setting conflicting configurations, and/or mitigate conflicts through default fallback behavior.

Orders can enforce priority levels maintained by the migration system 100 among different virtual machines. For example, the migration system 100 can order operations to be performed based on priorities or weights assigned to different types of migration cycles. For example, if migration cycles for cut-over operations are prioritized over other types of migration cycles, then the migration system can generate a schedule with an order in which outstanding cut-over operations are performed before other types of operations.

For instance, if the migration system 100 can only migrate ten virtual machines in parallel out of one hundred virtual machines total, then if a cut-over operation is requested for twenty virtual machines at once, the ten slots available to the migration system 100 will be used first for twenty cut-over cycles, before performing other types of migration cycles.

The migration system 100 can apply one or more guidelines or heuristics for determining the order of migration cycles for scheduled migrating virtual machines. In some examples, the migration system 100 may order migration of a second group of virtual machines from a second source environment, only after completing a respective migration cycle for each of a first group of virtual machines from a first source environment. Each group of virtual machines can be respectively interdependent to one another, for example as part of implementing a respective service.

In some examples, the migration system 100 may initiate periodic migration cycles only after first sync migration cycles.

The schedule generated by the migration system 100 specifies when periodic migration cycles are to be performed for migrating virtual machines. More migration cycles result in keeping the target environment of a migrating virtual machine up-to-date relative to a virtual machine in the source environment. More frequent migration cycles also typically reduce the amount of data to transfer from the source environment to the target environment, e.g., because the difference between a virtual machine snapshot between source and target computing environment is typically smaller as a result of more frequent migration cycles. More frequent migration cycles can reduce cut-over downtime for services implemented by the virtual machines. However, scheduling more migration cycles adds computational load to the migration system 100.

To balance computational load with a lower cut-over down time from more frequent migration cycles, the migration system 100 is configured to schedule migration cycles by balancing a number of factors. For example, the system 100 can increase or decrease the frequency at which migration cycles are scheduled based on, for example, how much data would need to be migrated in a migration cycle if it were to be scheduled at a particular point in time.

In some examples, the migration system 100 can implement a combination of time-driven and event-driven processes to generate a schedule. Under one non-limiting example of a time-driven process, the migration system 100 allows a predetermined amount of time to pass, e.g., 2 hours, since the last migration cycle of some virtual machine. At the predetermined amount of time, the migration system 100 can make a decision as to whether or not to issue another migration cycle, for example based on whether the migration system 100 has the resources to execute the migration cycle. If not, the migration system 100 can check back at a later time, e.g., in intervals of five minutes. Other time-driven processes can include processes performed by the system 100 during predetermined time intervals.

Under one non-limiting example of an event-driven process, the migration system 100 can determine whether to schedule another migration cycle as computing resources become available. For example, if a number of disk slots become available, the migration system 100 can determine which of the migrating virtual machines can have their migration cycle executed using the available disk slots. The migration system 100 can be configured to perform an event-driven process for scheduling in response to any event or sequence of events or conditions detected to occur during migration of a virtual machine.

In some examples, the migration system 100 schedules migration cycles based on, for example, available network bandwidth, the current load of the migration system 100, and historical data corresponding to how much time a migration cycle or operations of a migration cycle take for a virtual machine. In some examples, the migration system 100 can schedule migration cycles based on the last time a migration cycle was successfully performed for a particular virtual machine, or the number of disks a migrating virtual machine has.

In some examples, the migration system 100 can schedule migration cycles based on the amount of disk data and/or changed disk ranges for a migrating virtual machine. In one example, the system 100 can schedule migration cycles upon detecting changes in the virtual machine, e.g., the delta relative to the virtual machine at a previous migration cycle, being above or below a predetermined size threshold. As another example, if changes to data within some disk ranges, e.g., ranges of addresses on a disk, occur in excess of a predetermined rate, or a change in a large disk range occurs, the migration system 100 can schedule a cycle based on the changes. For example, the migration system 100 may schedule a cycle upon detecting that a predetermined percentage of data across different ranges were changed from the previous migration cycle. "Small" and "large" disk ranges or change rates can be predetermined automatically, for example relative to the average changed disk ranges size or rate of a virtual machine. In yet another example, the migration system 100 can track a disk rewrite rate of disk ranges on disk of the source virtual machine in excess of a predetermined rate. The migration system 100 can, for example, reduce the frequency at which migration cycles are scheduled for a virtual machine having disk rewrite rates in excess of a predetermined rate.

In examples in which groups of interdependent virtual machines are being migrated, the migration system 100 can schedule migration cycles so as to cause migration of each of the interdependent virtual machines to reduce the cut-over down time of a service implemented by the independent virtual machines In addition to the foregoing, the migration system 100 can also schedule migration cycles based on received constraints, weights, priorities, and the current state of the migration system 100 and available computing resources. In some examples, the system 100 can receive scheduling preferences, such as through user inputs or those automatically defined. Example scheduling preferences can include issuing another migration cycle for one or more migrating virtual machines from a specific source environment periodically, e.g., two hours after the end of a previous migration cycle. Another example scheduling preference can be for the migration system 100 to assign operational times, e.g., periods of time in which the migration system 100 is to perform operations relating to migration. In other words, the migration system 100 may only operate during certain periods of time, otherwise resources allocated to the migration system 100 may be used for other purposes outside of those periods of time.

Referring to FIG. 2, in one example, source virtual machines 210A-210C have already had their first migration cycle performed by the migration system and cut-over migration cycles have not yet been issued. In this example disk slot 220 is currently utilized as a part of a periodic migration cycle of source virtual machine B 210B. The migration system 100 can determine that disk slot 225 is unutilized and issue a periodic migration cycle for another virtual machine at that point in time. In determining whether to choose between virtual machine 210A or virtual machine 210C, the migration system 100 can compare weights each associated with a respective virtual machine, as well as how much time has passed since the last successful migration cycle for the virtual machines 210A, 210C. In one example, even though virtual machine 210A may have double the weight of virtual machine 210C, if virtual machine 210C has been waiting longer than virtual machine 210A for a subsequent migration cycle, the migration system may still select the virtual machine 210C over the virtual machine 210A.

Priority levels for virtual machines may shift over time, e.g., as a result of user input. Another way priority levels for a virtual machine may change is if the migration cycle performed for the virtual machine changes, e.g., switching from one type of migration cycle to another type of migration cycle with a different priority. Priority levels may change in a variety of different ways. For example, if the migration system 100 applies weights for prioritizing different virtual machines based on total disk size, then the priority of a virtual machine may change when its disk size increases or decreases. In some examples, a disk size change, either increasing or decreasing, can occur as a result of adding or removing a disk for the source virtual machine. In this way, the total disk size can be affected, and possibly cause the migration system 100 to change the priority of the migrating virtual machines. As another example, changes in which source or target computing environments are prioritized can change the priority of a virtual machine migrating from or to a source or target environment, respectively.

As another example, the system 100 may identify that a migrating virtual machine has finished its first migration cycle, and that periodic cycles for the virtual machine are heavy, e.g., include large deltas between cycles. If the migration system 100 further determines that the virtual machine has a high source rewrite rate, and that it is rewriting the same ranges of data over and over again, then no test clones are being created for the virtual machine. Therefore, the system can reduce the priority of the virtual machine instead of issuing migration cycles over and over again, until some timeout period elapses or the cut-over operation for the virtual machine begins.

At different points in time, e.g., different clock times or for different migration cycles, the migration system 100 may preempt the execution of a migration cycle or steps of a migration cycle in order to allow other, higher priority tasks, to be performed.

As part of determining whether to preempt or resume cycles for the various migrating virtual machines, the migration system 100 can make the determination based at least on an estimated time to perform each cycle. In addition, the system 100 can consider the prioritization of the various types of cycles. As another example, the migration system 100 can also make the determination based at least on the resume cost for preempting a migration cycle and then later resuming it. In at least some cases, resuming a migration cycle means performing all of the operations, e.g., determining a delta between snapshots, copying data, etc., over again. The migration system 100 can determine, for example, not to preempt a migration cycle that is close to complete, e.g., 99%, as the system 100 can determine if it is more efficient to allow the cycle to complete rather than preempt it and start again from scratch. The system 100 may forego preempting a migration cycle close to completion even if it is associated with a lower priority.

The migration system 100 can generate a dynamic schedule, in which the migration system 100 is configured to automatically preempt lower-priority virtual machines or cycles for migration, in favor of higher-priority virtual machines or cycles.

Figure 3:
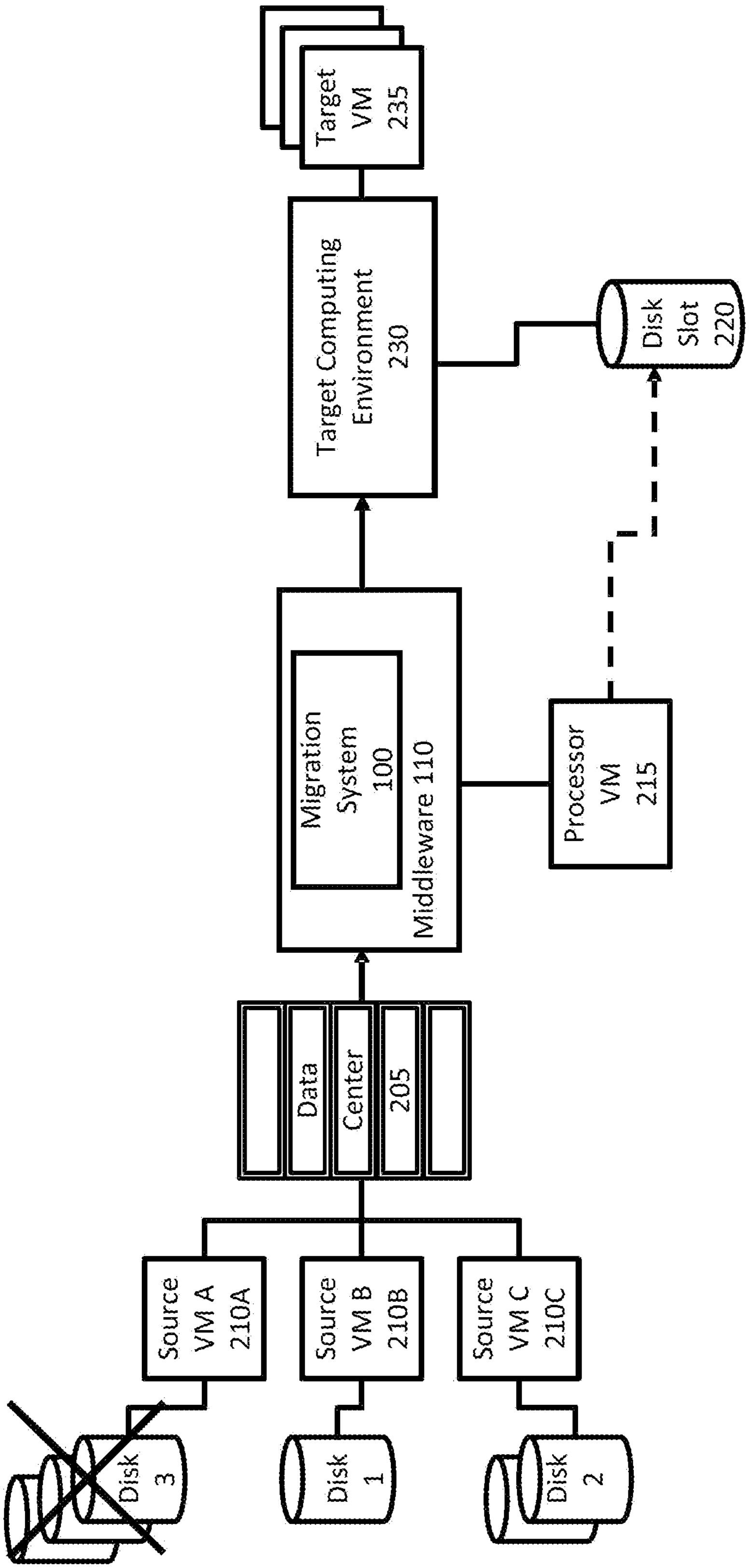
FIG. 3 is a block diagram illustrating a virtual machine preempted by the migration system, according to aspects of the disclosure.

FIG. 3 is a block diagram illustrating a virtual machine preempted by the migration system 100, according to aspects of the disclosure. As shown in FIG. 3, the processor virtual machine 215 includes only a single disk slot 220, in contrast to FIG. 2. In this example, source virtual B 210B may have a higher priority than source virtual machine A 210A. The migration system 100 can preempt migration of the source virtual machine A 210A in favor of performing operations for migrating virtual machine 210B. After performing cut-over operations for virtual machine 210B, the migration system 100 can resume performing operations for migrating virtual machine A 210A. An example implementation for scheduling can be a combination of time-driven and/or event-driven processes as described herein.

During a migration, the migration system 100 performs a number of operations. Such operations may include a migration cycle, a sub-operation within a migration cycle, a group of sub-operations forming a migration cycle step or sub-task of a migration cycle step, etc. Different operations may require different amounts of time or computing resources to perform. In the context of a group of virtual machines migrated from a common source environment, operations for some virtual machines in the group may require more time or computing resources to perform than operations for other virtual machines in the group. The migration system 100 can perform load-balancing of computing resources allocated to the migration of different virtual machines.

In one example, in migrating a group of virtual machines, some virtual machines may have multiple disks. The migration system 100 may have a limited amount of disk slots for handling disk migrations. The migration system can implement a load-balancing scheme, in addition to a schedule generated, for example, based on constraints, assigned weights, priorities, available computing resources, etc.

The migration system 100 can perform operations for the migration for some virtual machines in parallel for a period of time, e.g., a number of migration cycles, before operations corresponding to the migration of another group of virtual machines. The migration system 100 can determine the maximum number of virtual machines for which operations for migration can be performed in parallel based on received or measured hardware utilization data.

Any of a variety of different mechanisms can be implemented by the migration system 100 for determining the next group of virtual machines to perform migration operations for, in parallel. Computing resources available to the migration system 100 may be quantified as a number of resources, e.g., N resources. A computing resource can be, for example, a virtual machine configured to perform operations relating to migration of one or more of the migrating virtual machines. The migration system 100 can implement mechanisms for determining how operations are assigned to each of the N resources. The migration system 100 can maintain a queue or other data structure of various operations scheduled to be performed by the migration system 100. The operations can be represented in the queue or data structure as work items.

One class of example mechanisms includes round-robin or weighted round-robin distribution of work items to one of the N resources. In round-robin distribution, the migration system 100 dequeues a work item, e.g., work item i to resource i modulo N. In weighted round-robin, each resource is weighted, affecting how often new work items are dispatched to the resource. Another class of example mechanisms includes last recently used and least recently used distribution. In the last recently used distribution, the migration system 100 dispatches work items to the most recently used resource, moving to the next more recently used resource if the most recently used resource is at capacity. In the least recently used distribution, the migration system 100 dispatches work items to the resource that has been idle the longest. Another class of example mechanisms includes a least busy distribution. One example mechanism of this class is least busy distribution by count, in which work items are dispatched by the migration system 100 based on which resource currently has the fewest work items enqueued for processing. Another example mechanism is least busy distribution by percentage, in which the migration system 100 dispatches work items to the resource with the lowest utilization by percentage, measured for example, as a ratio of enqueued work items over a respective maximum number of work items that the resource can process at a time.

The migration system can implement a combination of these and other mechanisms for load-balancing. For example, work items for some resources can be dispatched according to a round-robin distribution, while other work items are dispatched according to a weight round-robin approach, or a last recently used approach on yet other resources. The migration system 100 may receive or automatically determine what combination of load-balancing mechanisms to apply. For example, the migration system 100 may receive data specifying how to load-balance as user input. In some examples, the migration system 100 can trial some distribution approaches or combinations of distribution approaches, measure the performance of the migration system 100, e.g., based on time in which work items are enqueued, average idle time of resources available on the migration system 100, etc., and apply the distribution approach or combination of distribution approach with the highest overall performance.

Figure 4:
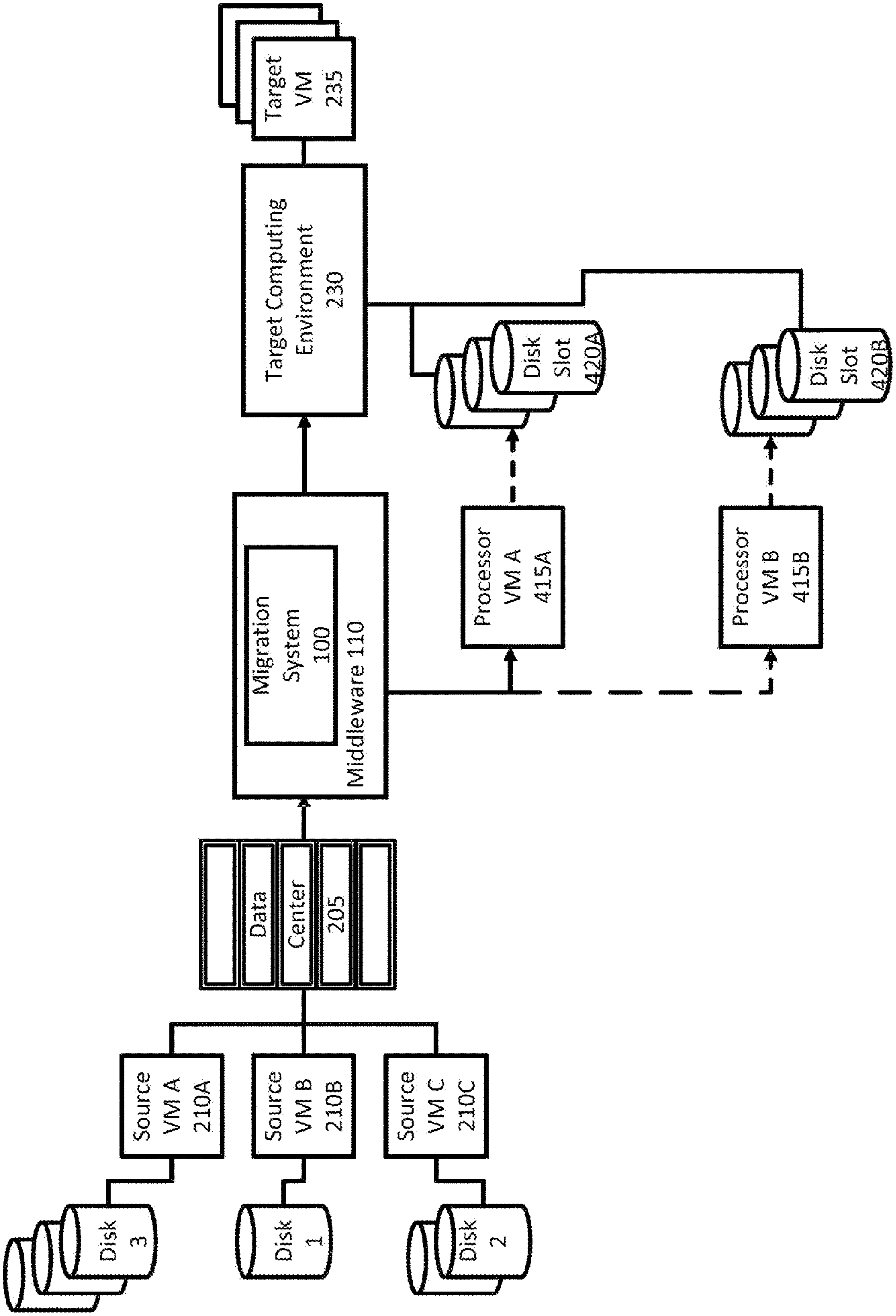
FIG. 4 is a block diagram showing the migration system load-balancing and scaling computing resources, according to aspects of the disclosure.

FIG. 4 is a block diagram showing the migration system 100 load-balancing and scaling computing resources, according to aspects of the disclosure. In FIG. 4, the migration system 100 includes two processor virtual machines 415A, 415B with corresponding disk slots 420A, 420B. In this example, source virtual machine C 210C may be idle, while migrations for virtual machines 210A, 210B are underway. As part of executing a generated schedule, the migration system 100 can apply a load-balancing mechanism so migration cycles for virtual machine C 210C are executed.

In performing the load-balancing, in some examples the migration system 100 can ensure that groups of virtual machines implementing a service are load-balanced together, to facilitate reducing the down time of the service when the cut-over operations are performed for each of the virtual machines.

The migration system 100 can be configured to increase or decrease computing resource allocation to the system 100 for migrating virtual machines. For example, the migration system 100 can automatically scale up and down computing resource allocation based on hardware utilization data received or measured by the system 100. As described herein with reference to the constraint data, the migration system 100 can receive data indicating computing resource requirements for a virtual machine slated for migration, and/or for different components that are part of the system 100 and are used to communicate with source and/or target computing environments. Computing resources may also be scaled up or down on devices or virtual machines used to perform migration on the migration system 100, for example middleware 110 as shown in FIG. 4.

The migration system 100 can be configured to assess computing resource utilization to determine whether scaling up or down certain resources improves performance of the migration system 100, e.g., reduces latency in migrating virtual machines or increases processing speed. For example, the migration system 100 may have a bottleneck in the network upload rate to a target computing environment. Adding additional virtual machines or physical resources in middleware 110 implementing the migration system 100 is unlikely to address the network bottleneck. Accordingly, upon determining that the performance has not improved, e.g., within a predetermined threshold, then migration system 100 can revert the added computing resources. For example, the migration system 100 can scale one or more of the processor virtual machines 415A, 415B and/or the disk slots 420A, 420B, as shown in FIG. 4.

As another example of scaling computing resources based on an assessment of computing resource utilization, the migration system 100 can reduce computing resource allocation and determine whether performance of the migration system 100 has reduced, e.g., within a predetermined threshold. If so, the migration system 100 can revert the changes.

In some examples, the migration system 100 can receive and account for the cost to scale resources up or down, e.g., measured in terms of energy consumption, monetary costs to operate, repair, or maintain, etc. As these costs can shift over time, the migration system 100 can continuously or periodically receive cost information and factor the costs into determining whether to scale resources up or down. This consideration can be in addition to other factors described herein.

Scaling computing resources can include, for example, increasing or decreasing network bandwidth through a network channel for communicating with a computing environment; increasing or decreasing memory allocation, e.g., volatile memory; increasing or decreasing disk slots allocation; adjusting the processing rate of the system 100 to allow for more or fewer virtual machines to be migrated in parallel, etc. Scaling can be performed periodically or on-demand, for example in response to user input. Scaling can be performed based on the state of the migration system. The state can refer to, for example, how many virtual machines are pending for migration, how many virtual machines are currently being cut-over, and so on. Scaling can be limited by constraints imposed on the system, such as physical constraints of available computing resources on the platform, or artificial constraints enforcing minimum QoS standards.

Figure 5:
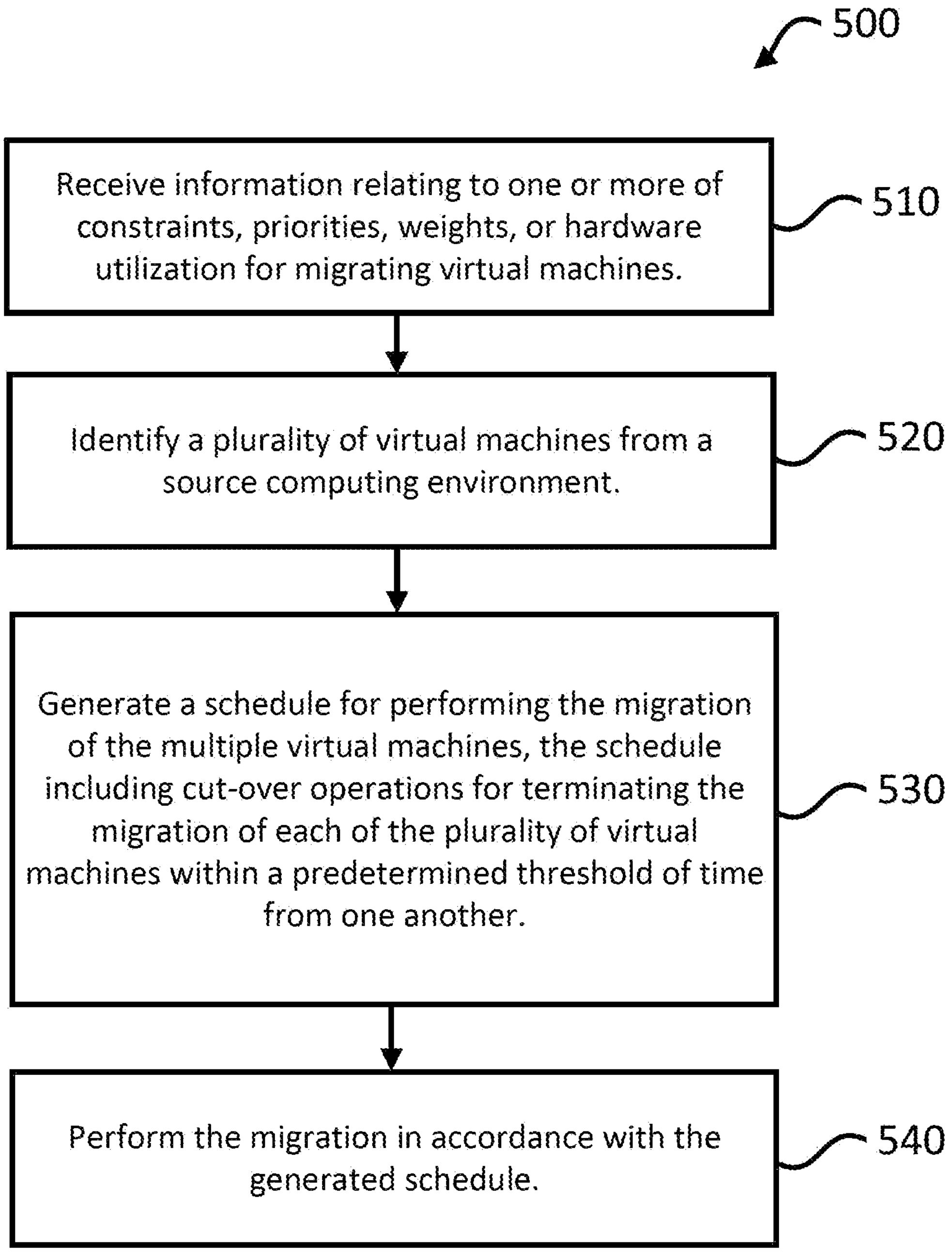
FIG. 5 is a flow diagram of an example process for migration of multiple virtual machines, according to aspects of the disclosure.

FIG. 5 is a flow diagram of an example process 500 for migration of multiple virtual machines, according to aspects of the disclosure.

A migration system receives information relating to one or more of constraints, priorities, weights, or hardware utilization for migrating virtual machines, according to block 510. As described herein with reference to FIGS. 1-3, the migration system can receive and/or generate priority levels, constraints, weights, and/or data related to hardware utilization, for determining how to order and schedule migration cycles for multiple migrating virtual machines.

The migration system identifies a plurality of virtual machines from a source computing environment, according to block 520. As described herein with reference to FIGS. 1-3, a group of migrating virtual machines may be interdependent. Collectively, the interdependent virtual machines may implement a service on the source computing environment.

The migration system generates a schedule for performing migration of the multiple virtual machines, according to block 530. The schedule can include cut-over operations for completing the migration of each of the plurality of virtual machines. By scheduling and ordering migration cycles as described herein, the migration system can reduce the cut-over downtime of a service implemented by the plurality of interdependent virtual machines. This is at least because the migration system can generate a schedule with the objective of reducing the down time of a service implemented by the plurality of virtual machines. For example, the migration system can further identify a second plurality of virtual machines implementing one or more services and update the generated schedule. The updated schedule, when executed by the migration system, can cause the migration system to suspend migration of the first plurality of virtual machines and execute operations for performing migration of the second plurality of virtual machines.

In determining whether to suspend migration of the first plurality of virtual machines, the migration system can make the determination at least partially based on received constraint data specifying one or more constraints for migrating the multiple virtual machines, received weights for a virtual machine, a source computing environment, or a target computing environment. In some examples, the determination can additionally or alternatively be at least partially based on hardware utilization data characterizing hardware utilization for one or more of the multiple virtual machines.

As described herein with reference to FIGS. 1-3, the migration system can also perform load-balancing for managing how migration cycles are executed on available computing resources for the system.

The migration system performs the migration in accordance with the generated schedule, according to block 540. The migration system can update the schedule and execute the updated schedule automatically or in response to an input, such as a user input. Periodically, or in response to a user input, the migration system can receive or generate new data. The new data may include, constraints, priorities, weights, hardware utilization, etc., as described herein, for ordering and scheduling migration cycles for the migrating virtual machines.

Figure 6:
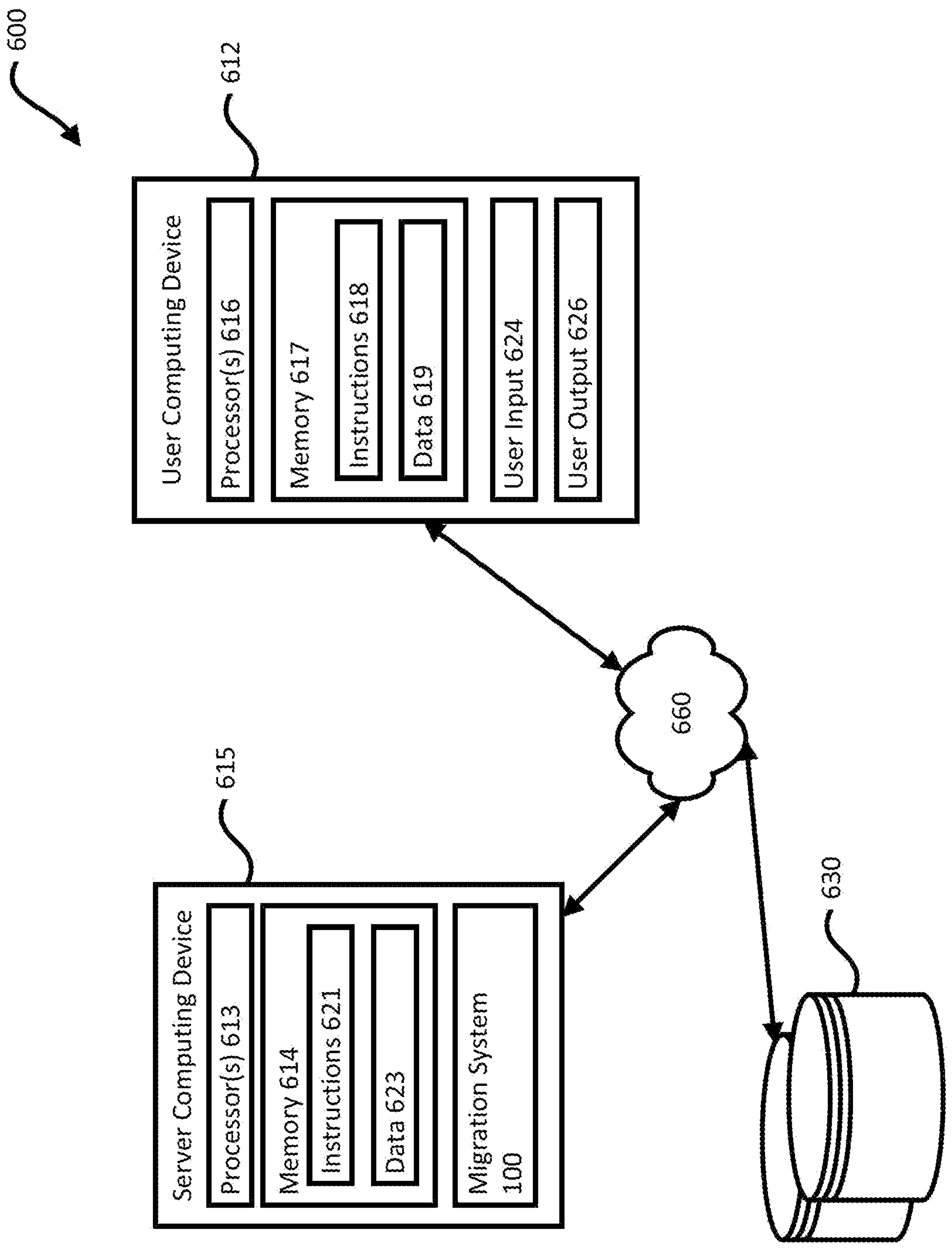
FIG. 6 is a block diagram of an example environment for implementing the migration system.

FIG. 6 is a block diagram of an example environment 600 for implementing the migration system 100. The system 100 can be implemented on one or more devices having one or more processors in one or more locations, such as in server computing device 615. User computing device 612 and the server computing device 615 can be communicatively coupled to one or more storage devices 630 over a network 660. The storage device(s) 630 can be a combination of volatile and non-volatile memory and can be at the same or different physical locations than the computing devices 612, 615. For example, the storage device(s) 630 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 615 can include one or more processors 613 and memory 614. The memory 614 can store information accessible by the processor(s) 613, including instructions 621 that can be executed by the processor(s) 613. The memory 614 can also include data 623 that can be retrieved, manipulated or stored by the processor(s) 613. The memory 614 can be a type of non-transitory computer readable medium capable of storing information accessible by the processor(s) 613, such as volatile and non-volatile memory. The processor(s) 613 can include one or more central processing units (CPUs), graphic processing units (GPUs), field-programmable gate arrays (FPGAs), and/or application-specific integrated circuits (ASICs), such as tensor processing units (TPUs).

The instructions 621 can include one or more instructions that when executed by the processor(s) 613, causes the one or more processors to perform actions defined by the instructions. The instructions 621 can be stored in object code format for direct processing by the processor(s) 613, or in other formats including interpretable scripts or collections of independent source code modules that are interpreted on demand or compiled in advance. The instructions 621 can include instructions for implementing the system 100 consistent with aspects of this disclosure. The system 100 can be executed using the processor(s) 613, and/or using other processors remotely located from the server computing device 615.

The data 623 can be retrieved, stored, or modified by the processor(s) 613 in accordance with the instructions 621. The data 623 can be stored in computer registers, in a relational or non-relational database as a table having a plurality of different fields and records, or as JSON, YAML, proto, or XML documents. The data 623 can also be formatted in a computer-readable format such as, but not limited to, binary values, ASCII or Unicode. Moreover, the data 623 can include information sufficient to identify relevant information, such as numbers, descriptive text, proprietary codes, pointers, references to data stored in other memories, including other network locations, or information that is used by a function to calculate relevant data.

The user computing device 612 can also be configured similarly to the server computing device 615, with one or more processors 616, memory 617, instructions 618, and data 619. The user computing device 612 can also include a user output 626, and a user input 624. The user input 624 can include any appropriate mechanism or technique for receiving input from a user, such as keyboard, mouse, mechanical actuators, soft actuators, touchscreens, microphones, and sensors.

The server computing device 615 can be configured to transmit data to the user computing device 612, and the user computing device 612 can be configured to display at least a portion of the received data on a display implemented as part of the user output 626. The user output 626 can also be used for displaying an interface between the user computing device 612 and the server computing device 615. The user output 626 can alternatively or additionally include one or more speakers, transducers or other audio outputs, a haptic interface or other tactile feedback that provides non-visual and non-audible information to the platform user of the user computing device 612.

Although FIG. 6 illustrates the processors 613, 616 and the memories 614, 617 as being within the computing devices 615, 612, components described in this specification, including the processors 613, 616 and the memories 614, 617 can include multiple processors and memories that can operate in different physical locations and not within the same computing device. For example, some of the instructions 621, 618 and the data 623, 619 can be stored on a removable SD card and others within a read-only computer chip. Some or all of the instructions and data can be stored in a location physically remote from, yet still accessible by, the processors 613, 616. Similarly, the processors 613, 616 can include a collection of processors that can perform concurrent and/or sequential operation. The computing devices 615, 612 can each include one or more internal clocks providing timing information, which can be used for time measurement for operations and programs run by the computing devices 615, 612.

The server computing device 615 can be configured to receive requests to process data from the user computing device 612. For example, the environment 600 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 612 may receive and transmit data specifying target computing resources to be allocated for executing a neural network trained to perform a particular neural network task.

The devices 612, 615 can be capable of direct and indirect communication over the network 660. The devices 615, 612 can set up listening sockets that may accept an initiating connection for sending and receiving information. The network 660 itself can include various configurations and protocols including the Internet, World Wide Web, intranets, virtual private networks, wide area networks, local networks, and private networks using communication protocols proprietary to one or more companies. The network 660 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 660, in addition or alternatively, can also support wired connections between the devices 612, 615, including over various types of Ethernet connection.

Although a single server computing device 615 and user computing device 612 are shown in FIG. 6, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured to perform different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

With respect to the use of substantially any plural and/or singular terms herein, for example (with the term "element" being a stand-in for any system, component, data, etc.) "an/the element," "one or more elements," "multiple elements," a "plurality of elements," "at least one element," etc., those having skill in the art can translate from the plural to the singular and/or from the singular to the plural as is appropriate to the context and/or application described. The various singular/plural permutations may be expressly set forth herein, for sake of clarity and without limitation unless expressly indicated.

The invention claimed is:

1. A system comprising:

one or more processors configured to, during one or more migration cycles of a migration of multiple virtual machines from one or more source computing environments to one or more target computing environments:

identify, from a plurality of interdependent virtual machines, a first plurality of virtual machines from a source computing environment of the one or more source computing environments, wherein the plurality of interdependent virtual machines collectively execute a service, and wherein at least one virtual machine of the plurality of interdependent virtual machines is configured to execute operations that receive, as input, data generated by another virtual machine of the plurality of interdependent virtual machines;

generate a schedule for performing the migration of the multiple virtual machines, the schedule including cut-over operations for completing the migration of each of the first plurality of virtual machines, wherein the cut-over operations are temporally ordered such that a cut-over operation of each of the first plurality of virtual machines is scheduled to occur within a predetermined threshold of time relative to the cut-over operations of other virtual machines of the first plurality virtual machines based on interdependencies among the first plurality of virtual machines and to reduce a downtime of the service incurred by performing the cut-over operations;

perform the migration of the first plurality of virtual machines in accordance with the generated schedule;

query constraint data from the source computing environment, while performing the migration of the first plurality of virtual machines, to determine a maximum number of a second plurality of virtual machines from the plurality of interdependent virtual machines, which can be migrated in parallel at any given point in time;

update the generated schedule based on the determined maximum number of the second plurality of virtual machines; and perform migration of the second plurality of virtual machines based on the updated schedule, wherein the updated schedule specifies performing operations related to migration for the first plurality of virtual machines and the second plurality of virtual machines, at least partially in parallel.

2. The system of claim 1, wherein the updated schedule includes operations for temporarily suspending migration of the first plurality of virtual machines and performing migration of the second plurality of virtual machines, and wherein the updated schedule is re-updated to switch the operations back to the migration of the first plurality of the virtual machines based on new query constraint data.

3. The system of claim 2, wherein the one or more processors are further configured to:

determine whether to suspend migration of the first plurality of virtual machines and execute operations for performing migration of the second plurality of virtual machines, at least partially based on received constraint data specifying one or more constraints for migrating the multiple virtual machines.

4. The system of claim 3, wherein the one or more processors are further configured to receive weights indicating priorities for one or more of the one or more virtual machines in a migration, the one or more source computing environments, or the one or more target computing environments; and wherein the determination is at least partially based on the weights.

5. The system of claim 4, wherein the one or more processors are further configured to receive hardware utilization data characterizing the hardware utilization of one or more of the multiple virtual machines; and wherein the determination is at least partially based on the hardware utilization data.

6. The system of claim 1, wherein the generated schedule specifies when to initiate a respective migration cycle for at least a portion of the multiple virtual machines.

7. A method comprising:

during one or more migration cycles of a migration of a plurality of interdependent virtual machines from one or more source computing environments to one or more target computing environments:

identifying, by one or more processors and from the plurality of interdependent virtual machines, a first plurality of virtual machines from a source computing environment of the one or more source computing environments, wherein the plurality of interdependent virtual machines collectively execute a service, and wherein at least one virtual machine of the plurality of interdependent virtual machines is configured to execute operations that receive, as input, data generated by another virtual machine of the plurality of interdependent virtual machines;

generating, by the one or more processors, a schedule for performing the migration of the multiple virtual machines, the schedule including cut-over operations for completing the migration of each of the first plurality of virtual machines, wherein the cut-over operations are temporally ordered such that a cut-over operation of each of the first plurality of virtual machines is scheduled to occur within a predetermined threshold of time relative to the cut-over operations of other virtual machines of the first plurality virtual machines based on interdependencies among the first plurality of virtual machines and to reduce a downtime of the service incurred by performing the cut-over operations;

performing, by the one or more processors, the migration of the first plurality of virtual machines in accordance with the generated schedule;

querying, by the one or more processors, constraint data from the source computing environment, while performing the migration of the first plurality of virtual machines, to determine a maximum number of a second plurality of virtual machines from the plurality of interdependent virtual machines, which can be migrated in parallel at any given point in time;

updating, by the one or more processors, the generated schedule based on the determined maximum number of the second plurality of virtual machines; and performing, by the one or more processors, migration of the second plurality of virtual machines based on the updated schedule, wherein the updated schedule specifies performing operations related to migration for the first plurality of virtual machines and the second plurality of virtual machines, at least partially in parallel.

8. The method of claim 7, wherein the updated schedule includes operations for temporarily suspending migration of the first plurality of virtual machines and performing migration of the second plurality of virtual machines; and wherein the updated schedule is re-updated to switch the operations back to the migration of the first plurality of the virtual machines based on new query constraint data.

9. The method of claim 8, wherein the method further comprises:

determining whether to suspend migration of the first plurality of virtual machines and executing operations for performing migration of the second plurality of virtual machines, at least partially based on received constraint data specifying one or more constraints for migrating the multiple virtual machines.

10. The method of claim 9, further comprising receiving weights indicating priorities for one or more of the one or more virtual machines in a migration, the one or more source computing environments, or the one or more target computing environments; and wherein the determining is at least partially based on the weights.

11. The method of claim 10, further comprising receiving hardware utilization data characterizing the hardware utilization of one or more of the multiple virtual machines; and wherein the determining is at least partially based on the hardware utilization data.

12. The method of claim 7, wherein the generated schedule specifies data indicating when to initiate a respective migration cycle for at least a portion of the multiple virtual machines.

13. One or more non-transitory computer-readable storage media encoding instructions that are operable, when executed by one or more processors, causes the one or more processors to perform operations comprising:

during one or more migration cycles of a migration of a plurality of interdependent virtual machines from one or more source computing environments to one or more target computing environments:

identifying, from the plurality of interdependent virtual machines, a first plurality of virtual machines from a source computing environment of the one or more source computing environments, wherein the plurality of interdependent virtual machines collectively execute a service, and wherein at least one virtual machine of the plurality of interdependent virtual machines is configured to execute operations that receive, as input, data generated by another virtual machine of the plurality of interdependent virtual machines;

generating a schedule for performing the migration of the multiple virtual machines, the schedule including cut-over operations for completing the migration of each of the first plurality of virtual machines, wherein the cut-over operations are temporally ordered such that a cut-over operation of each of the first plurality of virtual machines is scheduled to occur within a predetermined threshold of time relative to the cut-over operations of other virtual machines of the first plurality virtual machines based on interdependencies among the first plurality of virtual machines and to reduce a downtime of the service incurred by performing the cut-over operations;

performing the migration of the first plurality of virtual machines in accordance with the generated schedule;

querying constraint data from the source computing environment, while performing the migration of the first plurality of virtual machines, to determine a maximum number of a second plurality of virtual machines from the plurality of interdependent virtual machines, which can be migrated in parallel at any given point in time;

updating the generated schedule based on the determined maximum number of the second plurality of virtual machines; and performing migration of the second plurality of virtual machines based on the updated schedule, wherein the updated schedule specifies performing operations related to migration for the first plurality of virtual machines and the second plurality of virtual machines, at least partially in parallel.

14. The one or more computer-readable storage media of claim 13, wherein the updated schedule includes operations for temporarily suspending migration of the first plurality of virtual machines and performing migration of the second plurality of virtual machines; and wherein the updated schedule is re-updated to switch the operations back to the migration of the first plurality of the virtual machines based on new query constraint data.

* * * * *